(No Model.)
F. A. CARLSON.
AXLE BOX FOR LOCOMOTIVES.
No. 403,735. Patented May 21 1889.
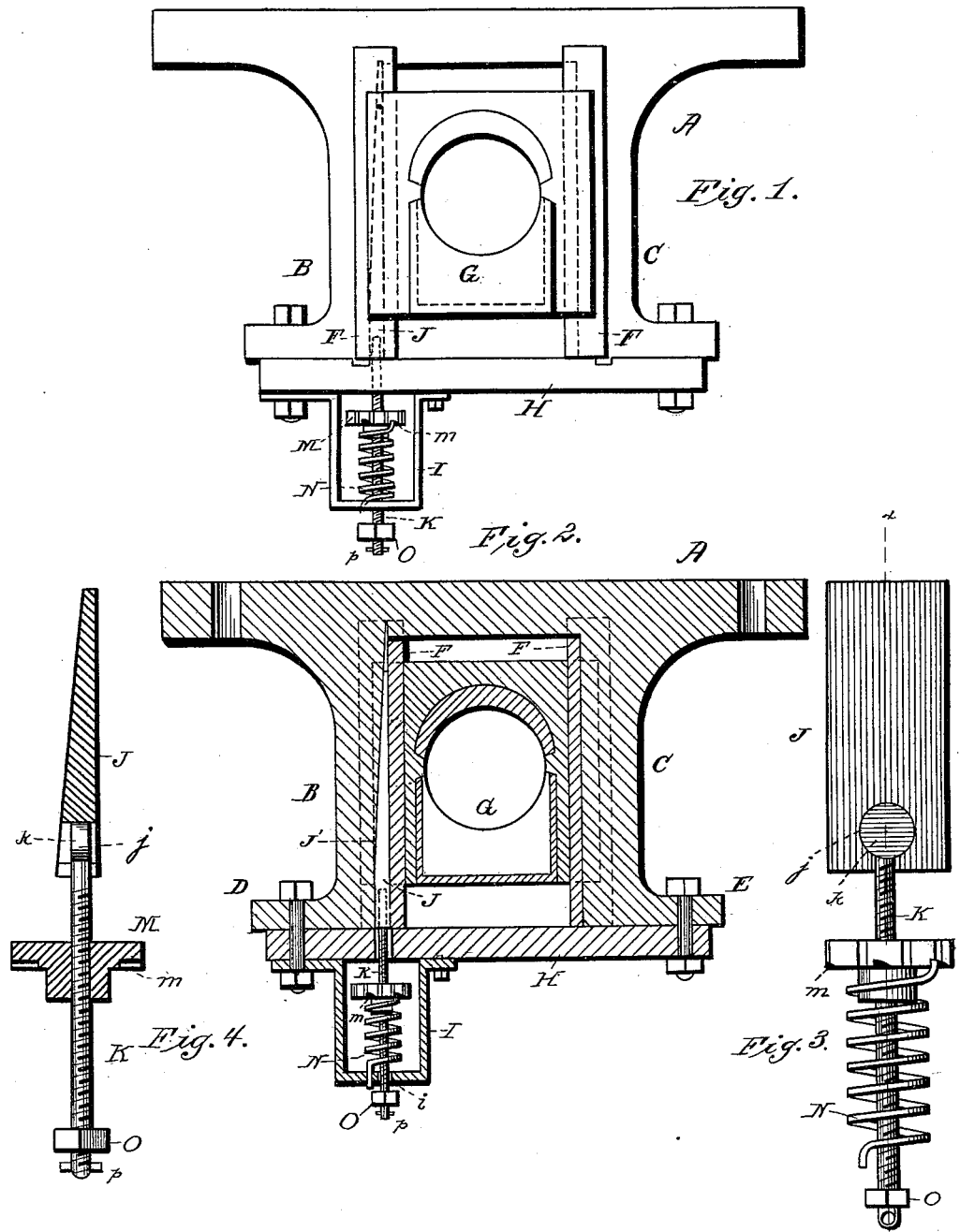
Witnesses
M. A. Harris
Henry Donovan
Inventor,
Frank A. Carlson
Harris & Boulter
Attorneys

UNITED STATES PATENT OFFICE.

FRANK AUGUST CARLSON, OF DALLAS, TEXAS.

AXLE-BOX FOR LOCOMOTIVES.

SPECIFICATION forming part of Letters Patent No. 403,735, dated May 21, 1889.

Application filed February 25, 1889. Serial No. 301,146. (No model.)

*To all whom it may concern:*

Be it known that I, FRANK AUGUST CARLSON, of Dallas, in the county of Dallas and State of Texas, have invented a new and useful Improvement on Axle or Driving Boxes for Railroad-Locomotives, of which the following is a full and exact description, reference being here made to the accompanying diagram, and to the letters of reference marked thereon.

The invention has relation to self-adjusting wedges for axle or driving boxes for locomotives, and has for its objects to produce a wedge that is controlled by a spring, which can be readily and easily adjusted for removing the pounding and lost motion between the axle-box and pedestal, as hereinafter described, illustrated in the accompanying drawings, and pointed out in the claim.

Figure 1 is a side elevation of a pedestal and axle-box of a locomotive with my improvement attached. Fig. 2 is a vertical longitudinal section thereof through the center. Fig. 3 is a detail view of the wedge and bolt. Fig. 4 is a vertical transverse section of the same on the line $x\ x$, Fig. 3.

Referring to the accompanying drawings, forming a part of this specification, in which like letters of reference indicate corresponding parts, A indicates the pedestal of a locomotive of any approved construction, provided with the parallel dependent arms B C and the short horizontal arms D E.

F F designate metal shoes adapted to fit over the dependent arms B C, between which is held and adapted to slide the axle-box G, of the usual well-known construction. Attached to the under side of the bottom plate, H, of the pedestal in any desired manner is a hanger or stirrup, I, provided with an opening, $i$, for a purpose hereinafter explained.

J indicates a wedge of ordinary construction and designed to fit in the recess J', formed between the inner faces of the dependent arm B and shoe F, said wedge being provided in its lower edge with the cylindrical opening $j$, in which fits loosely the enlarged end $k$ of the threaded bolt K. The bolt K passes downward through an opening in the bottom plate, H, and the opening $i$ in the hanger I.

M designates a screw-threaded flange or nut designed to travel on the bolt K, said flange or nut being provided in its lower face with notches $m$, for a purpose presently explained.

Surrounding the bolt K, and having one of its ends secured in the opening $i$ and its opposite end engaging one of the notches $m$ of the flange or nut M, is a coil-spring, N, designed to press against the flange N and cause the wedge to adjust itself according to the amount of lost motion between the pedestal and axle-box.

For readily withdrawing the wedge in case it should become jammed from any cause, I provide the bolt K on its lower end, below the hanger I, with a jack-nut, O, and to prevent the loss of said nut I provide the bolt with a pin, $p$.

The operation of my device may be briefly described as follows: The parts having been placed in position, the desired tension is put upon the spring N, and as the axle-box or shoes wear, causing lost motion and pounding in said parts, the wedge is, by reason of the tension on the spring N, caused to adjust itself and remove all pounding and lost motion.

Having thus described my invention, what I claim, and desire to secure by Letters Patent, is—

In an axle-box for a locomotive, the combination of the wedge, the bolt attached thereto, the flange, the spiral spring, and a suitable support for the same, substantially as specified.

FRANK AUGUST CARLSON.

Witnesses:
 WM. H. CLARK,
 H. DONGLER.